US012646177B2

(12) United States Patent
Das et al.

(10) Patent No.: US 12,646,177 B2
(45) Date of Patent: Jun. 2, 2026

(54) FEATURE CONDITIONED OUTPUT TRANSFORMER FOR GENERALIZABLE SEMANTIC SEGMENTATION

(71) Applicant: QUALCOMM Incorporated, San Diego, CA (US)

(72) Inventors: Debasmit Das, San Diego, CA (US); Shubhankar Mangesh Borse, San Diego, CA (US); Hyojin Park, San Diego, CA (US); Kambiz Azarian Yazdi, San Diego, CA (US); Hong Cai, San Diego, CA (US); Risheek Garrepalli, San Diego, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 351 days.

(21) Appl. No.: 18/349,726

(22) Filed: Jul. 10, 2023

(65) Prior Publication Data

US 2024/0020844 A1     Jan. 18, 2024

Related U.S. Application Data

(60) Provisional application No. 63/388,645, filed on Jul. 13, 2022.

(51) Int. Cl.
*G06T 7/11* (2017.01)

(52) U.S. Cl.
CPC ...... *G06T 7/11* (2017.01); *G06T 2207/20004* (2013.01); *G06T 2207/20081* (2013.01)

(58) Field of Classification Search
CPC ............ G06T 7/11; G06T 2207/20004; G06T 2207/20081; G06N 3/044; G06N 3/0455; G06N 3/0464; G06N 3/084; G06N 3/088; G06N 3/09; G06V 10/26; G06V 10/82
See application file for complete search history.

(56) References Cited

U.S. PATENT DOCUMENTS

| | | | | |
|---|---|---|---|---|
| 11,605,216 | B1 * | 3/2023 | Do | G06V 10/60 |
| 2019/0251480 | A1 * | 8/2019 | Garcia Duran | G06F 16/9024 |
| 2023/0316085 | A1 * | 10/2023 | Li | G06N 3/045 |
| | | | | 706/15 |
| 2024/0013055 | A1 * | 1/2024 | Liu | G06N 3/096 |
| 2024/0020848 | A1 * | 1/2024 | Das | G06T 7/168 |
| 2024/0070541 | A1 * | 2/2024 | Borse | G06N 20/00 |

(Continued)

OTHER PUBLICATIONS

International Search Report and Written Opinion—PCT/US2023/069984—ISA/EPO—Oct. 5, 2023.

(Continued)

*Primary Examiner* — Bobbak Safaipour
(74) *Attorney, Agent, or Firm* — Polsinelli LLP

(57) ABSTRACT

Systems and techniques are provided for processing data (e.g., image data). For instance, according to some aspects of the disclosure, a method may include receiving, at a transformer of a machine learning system, learnable queries, keys, and values obtained from a feature map of a segmentation model of the machine learning system. The method may further include learning, via the transformer, a mapping between an unsupervised output and a supervised output of the segmentation model based on the feature map.

30 Claims, 7 Drawing Sheets

(56) References Cited

U.S. PATENT DOCUMENTS

2024/0428939 A1\* 12/2024 Verma .................. G16H 50/20

OTHER PUBLICATIONS

Li Y., et al., "Test-Time Personalization with a Transformer for Human Pose Estimation", Arxiv.org, Cornell University Library, 201 Olin Library Cornell University Ithaca, NY 14853, arXiv:2107. 02133v3 [cs.CV], Nov. 8, 2021, XP091089165, pp. 1-18, abstract, p. 1-p. 10.

Volpi R., et al., "On the Road to Online Adaptation for Semantic Image Segmentation", 2022 IEEE/CVF Conference on Computer Vision and Pattern Recognition (CVPR), [Online], arXiv:2203. 16195v1 [cs.CV], Mar. 30, 2022, XP093085094, 21 pages, pp. 19162-19173.

\* cited by examiner

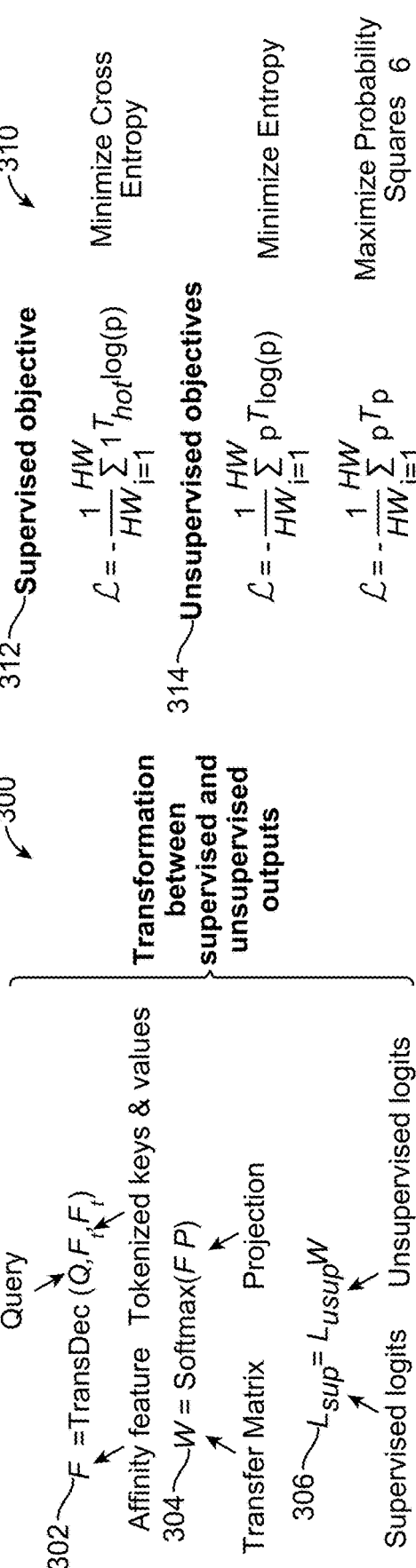

302 — $F_t = \text{TransDec}\,(Q, F_t, F_t)$
Affinity feature  Tokenized keys & values 304 — $W = \text{Softmax}(F\,P)$
Transfer Matrix    Projection 306 — $L_{sup} = L_{usup}\,W$ Supervised logits    Unsupervised logits Transformation between supervised and unsupervised outputs

312 — Supervised objective

$$\mathcal{L} = -\frac{1}{HW}\sum_{i=1}^{HW} 1\, T_{hot}\log(p)$$

Minimize Cross Entropy

314 — Unsupervised objectives

$$\mathcal{L} = -\frac{1}{HW}\sum_{i=1}^{HW} p\, T\log(p)$$

Minimize Entropy $$\mathcal{L} = -\frac{1}{HW}\sum_{i=1}^{HW} p\, T\, p$$

Maximize Probability Squares  6

Receive, At A Transformer Of A Machine Learning System, Learnable Queries, Keys, And Values Obtained From A Feature Map Of A Segmentation Model Of The Machine Learning System

404

Learn, Via The Transformer, A Mapping Between An Unsupervised Output And A Supervised Output Of The Segmentation Model Based On The Feature Map

FEATURE CONDITIONED OUTPUT TRANSFORMER FOR GENERALIZABLE SEMANTIC SEGMENTATION

PRIORITY CLAIM

This application claims the benefit of U.S. Provisional Application No. 63/388,645, filed on Jul. 13, 2022, which is hereby incorporated by reference, in its entirety and for all purposes.

FIELD

The present disclosure generally relates to image processing. For example, aspects of the present disclosure are directed to systems and techniques for providing a feature conditioned output transformer on top of an existing segmentation model that learns a mapping between unsupervised output and supervised output.

BACKGROUND

The increasing versatility of digital camera products has allowed digital cameras to be integrated into a wide array of devices and has expanded their use to different applications. For example, phones, drones, cars, computers, televisions, and many other devices today are often equipped with camera devices. The camera devices allow users to capture images and/or video from any system. The images and/or videos can be captured for recreational use, professional photography, surveillance, and automation, among other applications. Moreover, camera devices are increasingly equipped with specific functionalities for modifying images or creating artistic effects on the images. For example, many camera devices are equipped with image processing capabilities for generating different effects on captured images.

Many image processing techniques rely on image segmentation algorithms that divide an image into segments which can be analyzed or processed to identify objects, produce specific image effects, etc. Some example practical applications of image segmentation include chroma key compositing, feature extraction, object detection, recognition tasks (e.g., object recognition, face recognition, etc.), image stylization, machine vision, medical imaging, and depth-of-field (or "bokeh") effects, among others. However, camera devices and image segmentation techniques often yield poor and inconsistent results.

Some systems utilize machine learning models to perform semantic segmentation on images. Such systems can be referred to as adaptive semantic segmentation systems. Many adaptive semantic segmentation systems that utilize a machine learning model require the model to be adapted on-device to an online stream of unlabeled target domain data, which requires a large amount of computational resources and memory. Many machine learning models are developed using powerful computing systems with a limited amount of training data and then deployed on user devices (e.g., personal computers, laptops, mobile devices, etc.) that do not have the same high level of compute resources. Such devices may not have the capacity for on-device training (e.g., via backpropagation as part of the training process) for a machine learning model.

SUMMARY

In some examples, systems and techniques are described for providing a transformer machine learning model on top of an existing semantic segmentation model. A transformer is a deep learning model that adopts the concept of self-attention, which involves differentially weighting the significance of each part of the input data. Transformers are designed to process sequential input data. However, the attention mechanism provides context for any input in the input sequence, which enables the ability to perform parallel processing of the input data. The transformer can be trained to learn a mapping between unsupervised and supervised outputs by conditioning on an intermediate feature map from the semantic segmentation model.

According to at least one example, a processor-implemented method of processing data (e.g., image data) is provided. The method may include receiving, at a transformer of a machine learning system, learnable queries, keys, and values obtained from a feature map of a segmentation model of the machine learning system; and learning, via the transformer, a mapping between an unsupervised output and a supervised output of the segmentation model based on the feature map.

In another example, an apparatus for processing data is provided. The apparatus may include at least one memory configured to store features associated with a transformer of a machine learning system and at least one processor (e.g., implemented in circuitry) coupled to the at least one memory and configured to: receive, via the transformer of the machine learning system, learnable queries, keys, and values obtained from a feature map of a segmentation model of the machine learning system; and learning, via the transformer, a mapping between an unsupervised output and a supervised output of the segmentation model based on the feature map.

In another example, a non-transitory computer-readable medium is provided that has stored thereon instructions that, when executed by one or more processors, cause the one or more processors to: receive, via a transformer of a machine learning system, learnable queries, keys, and values obtained from a feature map of a segmentation model of the machine learning system; and learning, via the transformer, a mapping between an unsupervised output and a supervised output of the segmentation model based on the feature map.

In another example, an apparatus is provided. The apparatus may include means for receiving, via a transformer of a machine learning system, learnable queries, keys, and values obtained from a feature map of a segmentation model of the machine learning system; and means for learning, via the transformer, a mapping between an unsupervised output and a supervised output of the segmentation model based on the feature map.

In some aspects, one or more of the apparatuses described herein is, can be part of, or can include a mobile device or wireless communication device (e.g., a mobile telephone or so-called "smart phone" or other mobile device), an extended reality (XR) device (e.g., a virtual reality (VR) device, an augmented reality (AR) device, or a mixed reality (MR) device), a vehicle or computing system, device, or component of a vehicle, a wearable device (e.g., a network-connected watch or other wearable device), a personal computer, a laptop computer, a tablet computer, a server computer, a robotics device or system, an aviation system, or other system or device. In some aspects, the apparatus includes an image sensor (e.g., a camera) or multiple image sensors (e.g., multiple cameras) for capturing one or more images. In some aspects, the apparatus includes one or more displays for displaying one or more images, notifications, and/or other displayable data. In some aspects, the apparatus includes one or more speakers, one or more light-emitting devices, and/or one or more microphones. In some aspects, the apparatuses described above can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following drawing figures:

FIG. 3A illustrates transformation formulae between supervised and unsupervised outputs, in accordance with some examples;

FIG. 3B illustrates various objectives such as supervised objectives and unsupervised objectives, in accordance with some examples;

DETAILED DESCRIPTION

Figure 1A:
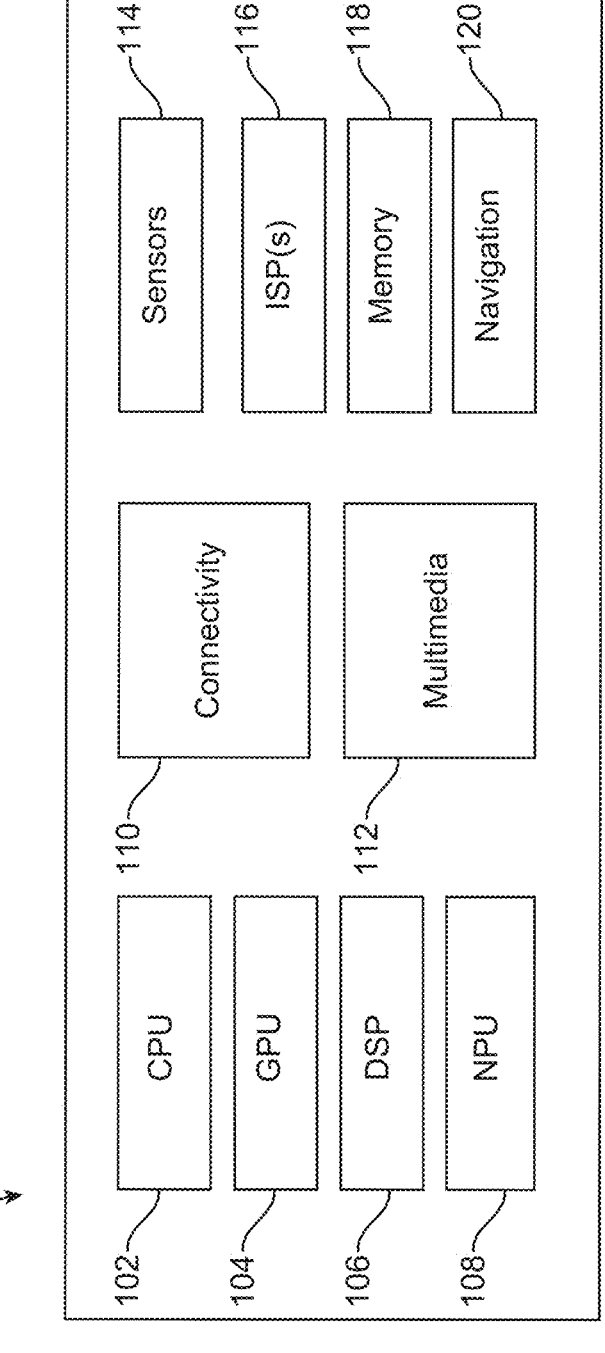
FIG. 1A illustrates an example implementation of a system-on-a-chip (SoC), in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The demand and consumption of image and video data has significantly increased in consumer and professional settings. Many devices and systems are equipped with capabilities for capturing and processing image and video data. For example, a camera or a computing device including a camera (e.g., a mobile telephone or smartphone including one or more cameras) can capture a video and/or image of a scene, a person, an object, etc. The image and/or video can be captured and processed and output (and/or stored) for consumption. The image and/or video can be further processed for certain effects, such as, without limitation, compression, frame rate up-conversion, sharpening, color space conversion, image enhancement, high dynamic range (HDR), de-noising, low-light compensation, among others. The image and/or video can also be further processed for certain applications such as computer vision, extended reality (e.g., augmented reality, virtual reality, and the like), image recognition (e.g., face recognition, object recognition, scene recognition, etc.), and autonomous driving, among others. In some examples, the image and/or video can be processed using one or more image or video artificial intelligence (AI) models, which can include, but are not limited to, AI quality enhancement and AI augmentation models.

Image and video processing operations can be computationally intensive. In some cases, image and video processing operations can become increasingly computationally intensive as the resolution of the input image or frame of video data increases (e.g., as the number of pixels to be processed per input image or frame of video data increases). For example, a frame of video data with a 4K resolution can include approximately four times as many individual pixels as a frame of video data with a full HD (e.g., 1080p) resolution. In some examples, image and video processing operations can be performed by processing each pixel individually. In some examples, image and video processing operations can be performed using one or more machine learning models to derive a mapping from input image data (e.g., raw image data captured by one or more image sensors) to a final output image.

For example, one or more machine learning models (e.g., deep learning systems) can be used to derive a mapping between raw image data that includes a color value for each pixel location and a final output image. The final output image can include processed image data derived from the raw image data (e.g., based on the mapping learned by the one or more machine learning models). In some examples, the one or more machine learning models can include a neural network of convolutional filters (e.g., a convolutional neural network (CNN)) for the image and/or video processing task. For example, an image processing neural network can include an input layer, multiple hidden layers, and an output layer. The input layer can include the raw image data from one or more image sensors. The hidden layers can include convolutional filters that can be applied to the input data, or to the outputs from previous hidden layers to generate feature maps. The filters of the hidden layers can include weights used to indicate an importance of the nodes of the filters. In some cases, the neural network can have a series of many hidden layers, with early layers determining simple and low-level characteristics of the raw image input data, and later layers building up a hierarchy of more complex and abstract characteristics. The neural network can then generate the final output image (e.g., making up the output layer) based on the determined high-level features.

Deep learning systems may produce state-of-the-art results when tested on data with similar distribution to training data that is used to train the deep learning systems. However, whenever there is large distribution shift between training and testing data, performance of deep learning systems may begin to degrade. For example, such a phenomenon is apparent when deep learning systems are deployed off-the-shelf on real-world environments, such as autonomous vehicles with a deep learning system trained to operate in one city but then is moved to a new city or extended reality (XR) devices (e.g., a virtual reality (VR) device, an augmented reality (AR) device, or a mixed reality (MR) device) with a deep learning system trained to operate in one location and that is then moved to a new location.

Various devices (e.g., autonomous vehicles, XR devices, etc.) may perform the task of semantic segmentation to classify pixels of images into different classes (e.g., a person, a sky, a building, a street, etc.). Semantic segmentation may perform dense prediction or labeling of pixels for better scene understanding. Because semantic segmentation can be a dense prediction task, labelling datasets for training and/or testing can be a laborious task. In some cases, semantic segmentation models can be pre-trained on synthetic datasets, where labels can be obtained (e.g., from game engines). Once the models are pre-trained on the synthetic datasets, the models can be deployed in real-world target environments provided the distribution shift is accounted for by using domain adaptation methods. These domain adaptation methods may assume the presence of a large number of unlabeled images from the target environment. As a result, the pre-trained semantic segmentation model may be fine-tuned on the large batches of unlabeled target domain images and also on the labeled source domain images, if present, for multiple iterations to produce a domain-invariant model. Such domain-invariant segmentation models may produce much better pixel accuracy compared to models without any adaptation on the unlabeled target domain data.

Although the above-described domain adaptation methods may provide a boost in image segmentation performance, the performance of such methods may be an overestimate with respect to more practical real-world adaptation scenarios. For instance, in current domain adaptive segmentation methods, there may be a held-out unlabeled target domain split for offline adaptation and a separate split for testing. In realistic situations, there may not be access to a large number of unlabeled images before evaluation can begin. For example, an XR device, a personal robot, or other device or system that attempts to segment a scene when deployed in a new environment gets exposed instantly to an online unsupervised stream of images. The semantic segmentation model deployed by such devices needs to adapt to the scene depicted in the online stream of images and also needs to provide accurate predictions on the online stream of images.

Current domain adaptation methods may not be directly applicable to an arrangement of online model adaptation on single test images at a time. For instance, forward and backward passes of a single image through a pre-trained segmentation model might produce noisy losses and gradients and consequently unreliable predictions. Further, adaptive semantic segmentation systems typically operate (e.g., are trained to operate) using batches of unlabeled target domain data as input and cannot handle online streaming data. For example, test-time adaptive (TTA) semantic segmentation considers adaptation of a source pre-trained image semantic segmentation model on unlabeled test images from a new target distribution. However, most TTA methods for semantic segmentation consider adapting on batches of target data distribution that is contrary to real-world situations, where samples from a novel environment arrive one-by-one in an online fashion. Furthermore, adaptive semantic segmentation systems typically use pseudo-labels for supervision. For instance, a machine learning system (e.g., a neural network) may process a batch of unlabeled images and output one or more segmentation masks for the batch of unlabeled images. Pseudo labels can be generated based on the one or more segmentation masks, which can be used to further train the machine learning system. However, pseudo-labels can be inherently noisy and thus can provide incorrect supervision for training the machine learning system (e.g., when performing supervised learning or training). Moreover, as noted above, some devices do not have an ability to perform training (e.g., lack an ability to perform backpropagation) due to limited computing capacity or memory storage limitations.

In some aspects, systems, apparatuses, methods (also referred to as processes), and computer-readable media (collectively referred to herein as "systems and techniques") are described herein for providing a transformer machine learning model on top of an existing semantic segmentation model (e.g., one or more neural networks). The transformer machine learning model can be trained to learn a mapping (e.g., transformations) between unsupervised and supervised outputs of the semantic segmentation model, such as by conditioning the transformer machine learning model on an intermediate feature map from the semantic segmentation model. In some cases, during test-time adaptation, the transformation maps unsupervised segmentation to more reliable supervised segmentation masks. The system can operate in an inference mode (also referred to as test-time inference) in which a supervised output is used for predictions. The system can also operate in an adaptation mode (also referred to as test-time adaptation) in which losses are determined based on the unsupervised output. The losses can be used to perform backpropagation to update the semantic segmentation model, and then inference is performed using the supervised output for predictions.

In general, transformer machine learning models are deep learning models that incorporate the concept of self-attention, which involves differentially weighting the significance of each part of input data and/or the recursive output data as well. Transformer machine learning models can process sequential input data and can process the entire input or batches of the input all at once. The self-attention mechanism provides context for any position in the input sequence. Such an approach unlocks the ability to perform more parallel processing and enables a system to perform training that might otherwise not have the computing resources to perform the training in the traditional way.

In some cases, the systems and techniques can include operations performed at both a pre-training stage and an adaptation phase. For instance, at the pre-training stage, the systems and techniques may obtain a model that can serve as an initialization for adaptation and hence produce better generalization. The systems described herein can learn a generalizable model by using a feature-conditioned transformer model to map from unsupervised predictions to supervised predictions, as noted above. For instance, the transformer model may perform cross-attention of learnable queries with keys and values obtained from tokens of intermediate feature maps (e.g., feature maps output by one or more hidden layers of the semantic segmentation model).

Such an operation produces a transfer weight matrix that is multiplied with an unsupervised head output to produce a supervised output. The transformer model may be trained by enforcing a supervised loss objective on the supervised head and an unsupervised loss on the unsupervised head. The supervised mask may depend, at least in part, on the unsupervised segmentation masks, unlike in multi-task learning settings where the heads can be related only through a shared feature backbone and therefore compete during training. During test-time adaptation on an image, an unsupervised loss may be back-propagated through the unsupervised head. For prediction, the supervised head may be used.

The systems and techniques described herein can enable a semantic segmentation system to generate better predictions during inference. For instance, adding a transformer model on top of an existing (e.g., pre-trained) segmentation model can make the segmentation model more generalizable. Better generalizable models may be critical for deployment on devices with hardware that does not support model adaptation on test data. For instance, in some cases, a device implementing the systems and techniques that may not have the resources to perform full backpropagation to train a full segmentation model may perform some level of adaptation of the semantic segmentation model on-device. A transformer model can be used, as transformer models can capture global context, which can be important for relating different classes for the unsupervised and supervised output. Other types of models can be used other than transformers, such as a fully connected layer network.

Various aspects of the present disclosure will be described with respect to the figures.

FIG. 1A illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor 114, image signal processors (ISPs) 116, and/or navigation module 120, which may include a global positioning system. In some examples, the sensor processor 114 can be associated with or connected to one or more sensors for providing sensor input(s) to sensor processor 114. For example, the one or more sensors and the sensor processor 114 can be provided in, coupled to, or otherwise associated with a same computing device.

The SOC 100 may be based on an ARM instruction set. In an aspect of the present disclosure, the instructions loaded into the CPU 102 may include code to search for a stored multiplication result in a lookup table (LUT) corresponding to a multiplication product of an input value and a filter weight. The instructions loaded into the CPU 102 may also include code to disable a multiplier during a multiplication operation of the multiplication product when a lookup table hit of the multiplication product is detected. In addition, the instructions loaded into the CPU 102 may include code to store a computed multiplication product of the input value and the filter weight when a lookup table miss of the multiplication product is detected. SOC 100 and/or components thereof may be configured to perform image processing using machine learning techniques according to aspects of the present disclosure discussed herein. For example, SOC 100 and/or components thereof may be configured to perform semantic image segmentation and/or object detection according to aspects of the present disclosure.

Machine learning (ML) can be considered a subset of artificial intelligence (AI). ML systems can include algorithms and statistical models that computer systems can use to perform various tasks by relying on patterns and inference, without the use of explicit instructions. One example of a ML system is a neural network (also referred to as an artificial neural network), which may include an interconnected group of artificial neurons (e.g., neuron models). Neural networks may be used for various applications and/or devices, such as image and/or video coding, image analysis and/or computer vision applications, Internet Protocol (IP) cameras, Internet of Things (IoT) devices, autonomous vehicles, service robots, among others.

Individual nodes in a neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as a feature map or an activation map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multi-layer perceptron (MLP) neural networks, transformer neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding this output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

Deep learning (DL) is one example of a machine learning technique and can be considered a subset of ML. Many DL approaches are based on a neural network, such as an RNN or a CNN, and utilize multiple layers. The use of multiple layers in deep neural networks can permit progressively higher-level features to be extracted from a given input of raw data. For example, the output of a first layer of artificial neurons becomes an input to a second layer of artificial neurons, the output of a second layer of artificial neurons becomes an input to a third layer of artificial neurons, and so on. Layers that are located between the input and output of the overall deep neural network are often referred to as hidden layers. The hidden layers learn (e.g., are trained) to transform an intermediate input from a preceding layer into a slightly more abstract and composite representation that can be provided to a subsequent layer, until a final or desired representation is obtained as the final output of the deep neural network.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 1B:
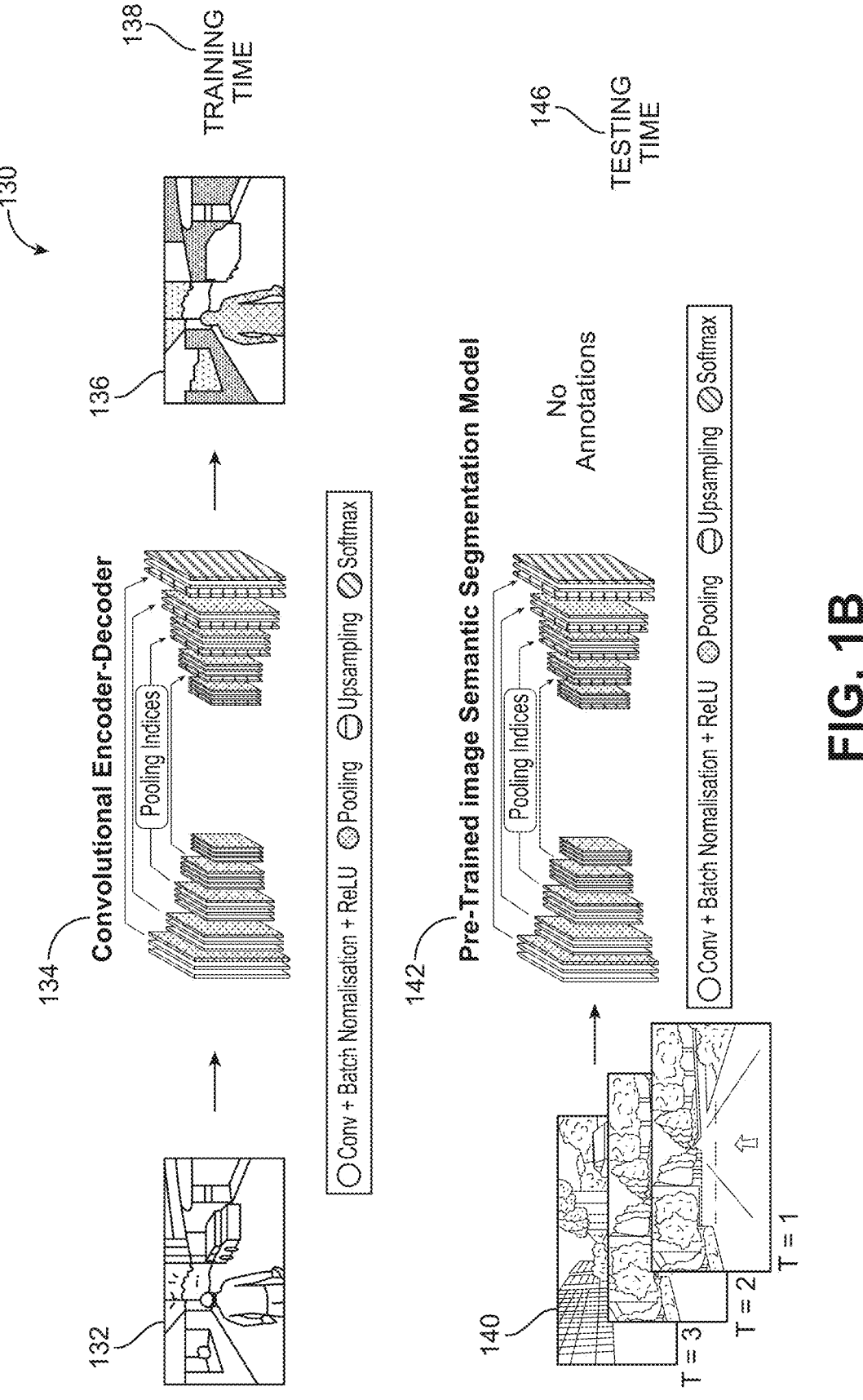
FIG. 1B illustrates an example framework for obtaining a pre-trained image semantic segmentation model and then using the model during testing time, in accordance with some examples.

FIG. 1B is a diagram illustrating an example framework 130 including an initial set of training data 132 that is used to train (during a training time 138) a convolutional encoder-decoder 134 to perform semantic segmentation. For example, once trained, the convolutional encoder-decoder 134 can produce an output classification or output data 136. As shown, the output data 136 can include a segmentation map. The segmentation map can include values (e.g., pixels or other data) identifying (e.g., classifying) different objects or regions of the image, such as a person, sky, a vehicle, a road, buildings and so forth. The convolutional encoder-decoder 134 can be pre-trained and then used for testing. At a later point in time (after the convolutional encoder-decoder 134 is trained to perform semantic segmentation), a series of images 140 (e.g., received at times T=1, T=2, and T=3) with no annotations or labels may be received at different times by a pre-trained image semantic segmentation model 142 (e.g., a pre-trained convolutional encoder-decoder trained to perform semantic segmentation) during a testing time 146. The pre-trained image semantic segmentation model 142 can be adapted or further trained using the series of images 140.

As noted above, systems and techniques are described herein that may enable a new pretraining strategy for an image semantic segmentation model (e.g., the image semantic segmentation model 142) that can generalize or adapt better to an online unsupervised stream of test images and produce more accurate predictions without the use of annotations in further training data.

Figure 2A:
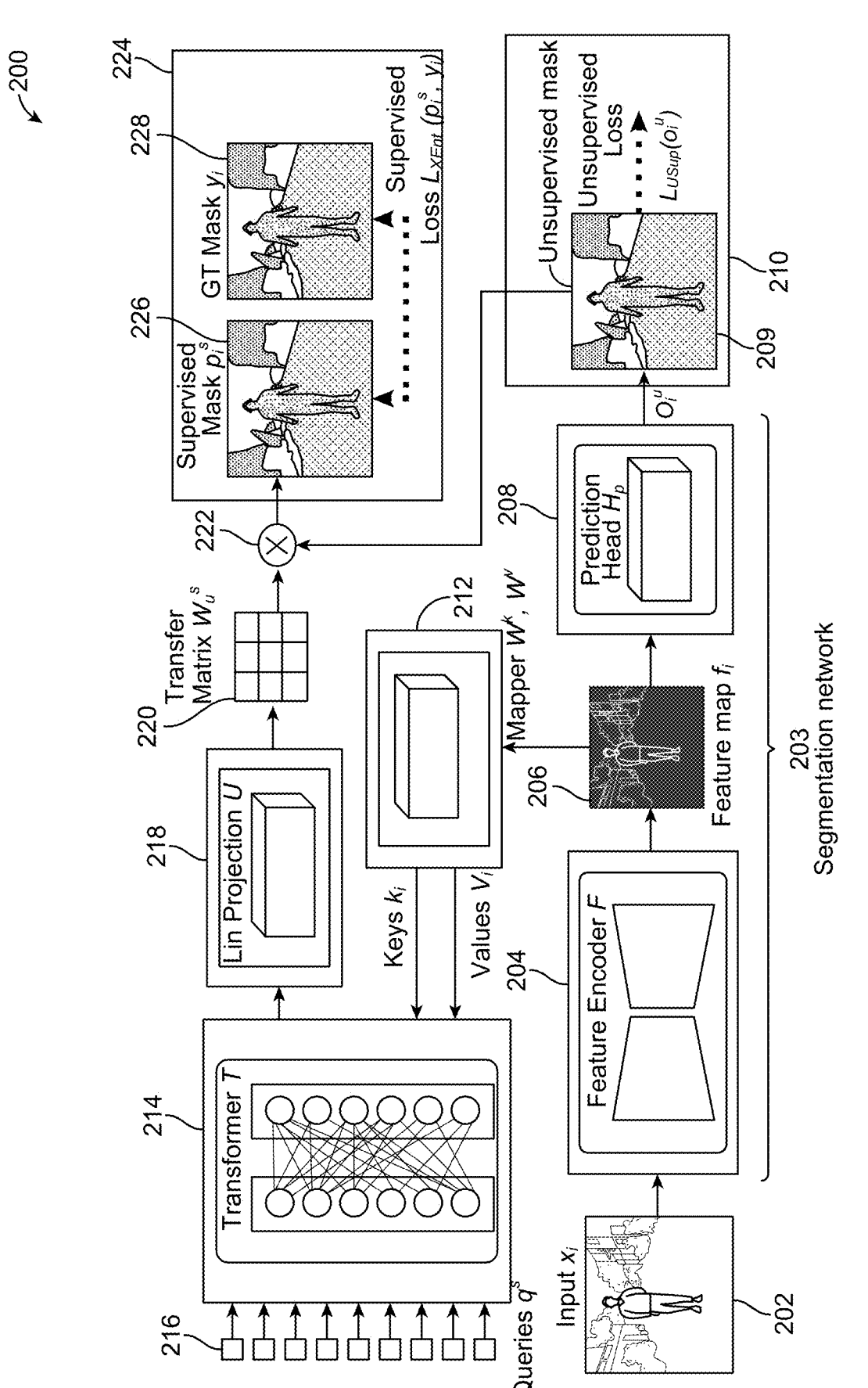
FIG. 2A illustrates an example framework for learning a transformer that is configured in connection with an existing segmentation model and that learns a mapping between unsupervised and supervised outputs by conditioning on an intermediate feature map, in accordance with some examples.

FIG. 2A is a diagram illustrating an example of a system 200 that can perform the systems and techniques described herein. As shown, an input image 202 can be provided to a pre-trained image semantic segmentation model or feature encoder 204. The input image 202 can include unlabeled image data (e.g., without labels used for supervised learning). In some cases, other types of input data can be provided as input to the system 200.

The following is a description of an example task to be performed by the disclosed system. Consider the availability of labeled source domain data $$X^s = \{(X_i^s, y_i^s)\}_{i=1}^{N_s}$$

with input images $$x_i^S \in \mathbb{R}^{H \times W \times 3}$$

and corresponding segmentation maps $$y_i^s \in \mathbb{R}^{H \times W \times L}.$$

Here, H and W are the height and width of the input image. L can represent the number of class labels. This labeled source domain data can be used to pretrain a model M. For online test-time adaptation, the model M can be adapted to a sequence of incoming unlabeled images $$X^t = \{(x_i^t)\}_{i=1}^{N_t}$$

from the target domain. The sequence of frames is not necessarily temporally correlated (e.g., the frames in the sequence may not be adjacent frames of a video). According to some aspects, as shown in FIG. 2A, the model can be further decomposed into sub-networks such as a feature extractor F 204 (also referred to as a feature encoder), classifier or prediction head H 208, and optionally transformer T 214.

FIG. 2A illustrates a process of pre-training with the use of a transformer model. A segmentation network 203 includes a feature encoder 204 (also referred to as a feature extractor F) and a classifier/prediction head 208. The feature encoder 204 can generate a feature map 206. The feature map 206 is provided to the classifier/prediction head 208. The output of the classifier/prediction head 208 is an unsupervised predicted segmentation mask 209 from which an unsupervised loss can be generated.

The feature map 206 is also provided to a mapper 212, which generates data such as keys and values associated with the feature map 206. For example, the mapper 212 may convert the feature map 206 into patches of data (which can be in, for example, an n×n matrix) and can flatten the patches of data into a one-dimensional vector or other representation of data that can be provided to a transformer 214. Operations can be performed on the one-dimensional vector to generate the keys and values, which are passed to the transformer 214. Queries 216 are also provided to the transformer 214. In some examples, the queries 216 can also be generated by performing one or more operations on the one-dimensional vector generated by the mapper 212.

An example of a key and a value can be associated with a feature map of dimensions 56×56×256. These values can represent a structure having 56 pixels in width, 56 pixels in height, and 256 channels. The system 200 can convert or transform this initial data into 4 patches, which may each have dimensions of 14×14×256 (4×14=56 for each of the width and the height of the structure). The patches are then converted into a one-dimensional vector or other data structure.

The keys and the values are generated or mapped using different operations (e.g., projections). For example, a token times a linear projection configured for keys will produce a set of keys. Another token or the same token times a linear projection for values will produce a set of values. The transformation of the feature map into keys and values can be performed in the mapper 212.

A query 216 as shown in FIG. 2A may be a learnable object or parameter. In some cases, the query 216 may be input to a mapper (not shown) that is also processed via a projection configured for the query 216. The transformer 214 performs multiple operations, such as a multiple head attention operation on the query, key and values as disclosed herein.

In some cases, a fully connected layer (not shown) may be used in addition to or as an alternative to the instead the transformer 214. The transformer 214 can be beneficial in that it provides a global context in its operation. The use of two heads (outputs) of the segmentation network 203 in connection with the transformer 214 enables the system 200 to determine a relationship between supervised features (e.g., supervised logits) and the unsupervised features (e.g., unsupervised logits). Logits are defined more fully below. Using a global context to produce a transformation via the transformer 214 improves the ability of the system 200 to find a relationship of classes of an image.

Figure 2B:
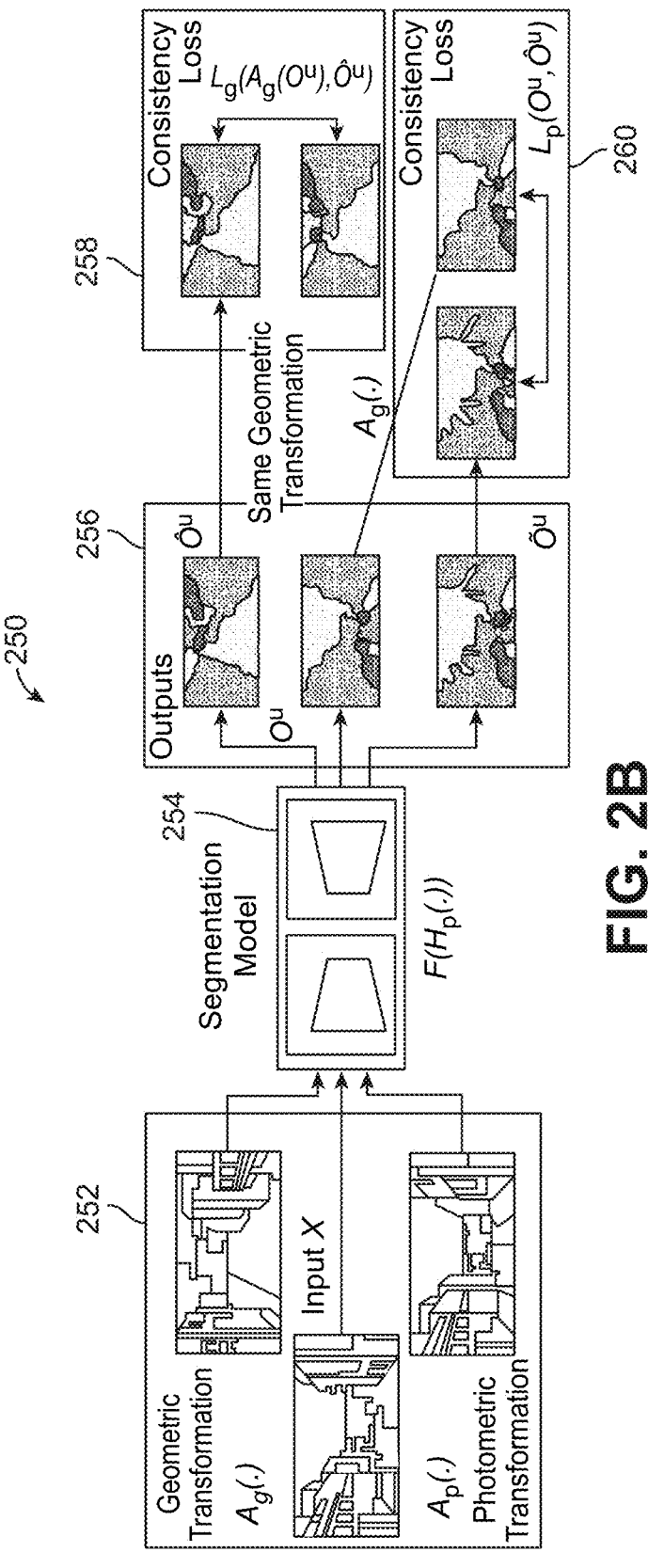
FIG. 2B illustrates an approach to test-time adaptation with photometric and geometric consistency losses, in accordance with some examples.

FIG. 2B illustrates an example system 250 showing test-time adaptation with photometric and geometric consistency losses 258, 260 associated with photometric augmentation and geometric augmentation 252. The system 250 illustrates an example of test-time adaptation of the segmentation network 203 of system 200 of FIG. 2A. For example, the segmentation model 254 of FIG. 2B is an example of the segmentation network 203 of FIG. 2A. For adaptation on an unlabeled sequence of images, the system 250 can optimize augmentation consistency loss using two types of augmentations—photometric augmentation and geometric augmentation 252. Such augmentations can be used in unsupervised segmentation for the clustering of features and producing a good initial representation. For photometric transformations, augmentations such as grayscale conversion, color jitter, gaussian blur, etc. can be used. When these types of transformations are applied on an input image, the segmentation map may not be different from when no transformation is applied on the input image. This property can be referred to as invariance with reference to photometric transformations. However, neural networks are highly sensitive to changes in input and can produce different segmentation maps when presented with a photometric transformation and hence not naturally invariant to photometric transformations.

The systems and techniques described herein can minimize the output prediction differences between the original input and its photometric augmentations. For example, considering a test image x and a sampled photometric augmentation $A_p(\bullet)$, when the photometric augmentation is applied on the test image x, the system 250 can produce an augmentation $\tilde{x}=A_p(x)$. For both the original input test image x and its augmentation $\tilde{x}$, a segmentation model 254 (e.g., segmentation network 203 of FIG. 2A) produces unsupervised output logits $o''=H(F(x))$ and $\tilde{o}''=H/(F(\tilde{x}))$ respectively. To minimize the difference between $o''$ and $\tilde{o}''$, the system 250 can use a discrepancy loss or consistency loss term $L_p(o'', \tilde{o}'')$ 260. Possible discrepancies can be an L1 distance, L2 distance, a divergence (e.g., a Kullback-Leibler divergence or KL divergence) between the probabilities obtained from the logits, any combination thereof, and/or other metric.

For geometric transformations, augmentations such as random cropping, rotations, pixel shuffling, etc. can be performed. When these augmentations are applied to an input image, the segmentation map may have the same transformation from the segmentation map of the original input image. This property of geometric transformation can be referred to as equivariance. Segmentation model 254 may not be necessarily equivariant to geometric transformations.

The systems and techniques described herein can enforce such equivariance by minimizing the difference in output predictions for the transformed segmentation map of the input image and the segmentation map of the transformed image. For example, considering a test image x and a sampled geometric augmentation $A_g(\bullet)$, when the geometric augmentation is applied on the test image, the system 250 can produce an augmented image $\hat{x}=A_g(x)$. For both the original input test image x and its augmentation $\hat{x}$, the system 250 produces unsupervised output logits $o''=H(F(x))$ and ô"=H(F(x̂)) 256 respectively. To enforce equivariance, the system 250 can minimize the difference between o" and the transformed logits $A_g$(ô") by using a discrepancy loss or consistency loss term $L_g$(o",$A_g$(ô")) 258. The discrepancy can be the same as that used for photometric augmentation consistency loss. For adapting the model on the test sample x, the system 250 uses the combination of photometric augmentation consistency loss and geometric augmentation consistency loss as follows:

$$L_{TT\ A}(x) = L_p(o", ô") + L_g(o", A_g(ô"))\qquad(7)$$

Once the model is updated using $L_{TT\ A}$(x), the system 250 can infer the output predictions with the supervised head using equation (5). In some cases, during test-time adaptation, the back-propagated gradients through the unsupervised head do not affect the transformer module and hence the transformer module remains frozen throughout. When the transformer module is not used, the model has a single head. The output logit o" and subsequently $L_{TT\ A}$(x) is processed through the single head after adaptation, and inference is carried out through the single head only. In some aspects, the pre-training and adaptation process or framework can be summarized as follows:

Given: Source dataset $$\mathcal{X}^s = \left\{\left(\mathbf{x}_i^s, \psi_i^s\right)\right\}_{i=1}^{N_s}\ \&$$

Target dataset sequence $$\mathcal{X}^t = \left\{\left(\mathbf{x}_i^t\right)\right\}_{i=1}^{N_t}$$

Step 1: Pre-train model on $\mathcal{X}^s$
    For each sampled batch from $\mathcal{X}^s$:
    For each sample $$(x_i^s, y_i^s)$$

Take gradient descent step of equation (4) with
      respect to parameters of F, $H_p$, T;
Step 2: Adaption and Evaluation on $\mathcal{X}^t$
    For each sample $$x_i^t$$

from $\mathcal{X}^t$:
    Take gradient descent steps of equation (5) with
      respect to parameters of F and $H_p$;
    Predict segmentation map of $$x_i^t$$

using equation (3).

In some aspects, for the segmentation network 203, the pre-trained checkpoints of DeepLab-V2 ResNet-101 can be used. For example, the ResNet-101 network can be trained on the corresponding source datasets using cross entropy loss. For the disclosed transformer 214, a 1-layer transformer decoder (e.g., without positional encoding) can be used. In some cases, an example default intermediate feature used for conditioning the transformer 214 can be the output of a block of the backbone. The transformer 214 can be trained on top of the segmentation network 203 using the loss defined in equation (4). Unless explicitly mentioned, one can set λ=0.1 and max squares as the unsupervised loss. For the augmentation consistency loss in equation (5), the L2 distance metric can be used as the default metric for both $\mathcal{L}_p(\cdot)$ and $\mathcal{L}_g(\cdot)$. For the adaptation, a Stochastic Gradient Descent (SGD) can be used with the learning rate of 1e−4. In some cases, only batch-norm parameters can be updated for one iteration per sample.

FIG. 3A illustrates example operations 300 of the transformer 214. The transformer 214 can receive queries 216 and tokenized keys and values and can use a transformer decoder (TransDec) operation to produce an affinity feature 302 (denoted as "F"). The "P" in the example operations 300 refers to the linear projection 218 of FIG. 2A (shown as U in FIG. 2A). Equations (3) and (4) generally relate to the TransDec operation 302. The affinity feature F and a projection P (e.g., the linear projection 218 in FIG. 2A) can be operated on by a Softmax operation 4 (or other operation) to generate the transfer matrix W as shown in FIG. 3A. The linear projection P 218 can be a linear projection or a linear weighting of the data. Generating the transfer matrix W 304 corresponds to equation (5). A transfer matrix 220 is also shown in FIG. 2A.

The output network 210 of the prediction head 208 includes the unsupervised predicted segmentation mask 209 and can include an unsupervised loss. The transfer matrix 220 operation is illustrated by equation 306 in FIG. 3A in which the supervised logits L sup are equal to the unsupervised logits $L_{unsup}$ multiplied by the transfer matrix W 220. A logit is the inverse of a standard logistic function and can be referred to as the log-odds since the logit is essentially equal to the logarithm of the odds p/(1−p), where p is a probability. A logit refers to features (e.g., from one or more feature maps) output by one or more layers of a model prior to a normalization layer (e.g., the features that will be input to the Softmax layer, such as the Softmax layer shown in FIG. 1B). Those of skill in the art will understand the use of logits in machine learning and data transformations and be able to utilize the logits associated with the unsupervised predicted segmentation mask 209 and a supervised segmentation mask 226. The use of logits is one example of data that can be used in connection with the introduction of the transformer 214 and associated components for providing an inference mode to the segmentation network 203.

The segmentation network 203 can be a multiple layer network. For example, there may be one hundred one layers in the segmentation network 203. The classifier/prediction head 208 can be the last two layers in some examples. Thus, the feature map 206 might represent the data in the state of a certain layer of the segmentation network 203. In another example, the feature map 206 may represent the data after layer 99 of the segmentation network 203, and the prediction head 208 can represent the last two layers of the network 203 before the network 203 produces the unsupervised predicted segmentation mask 209. The segmentation network 203 may also be characterized as a segmentation model or more generally any model which can include a segmentation model or any other machine learning model of a different type that can be used in the same manner as described herein.

The multiplication is represented by multiplier 222 in FIG. 2A. The transfer matrix W 220 involves determining how the classes in the different data sets relate to each other between two different types of output. The benefit of using the transformer 214 is to get the class-to-class relationship to generate supervised output. The general framework 224 of the output of the multiplier 222 includes a supervised segmentation mask 226 (also referred to as supervised prediction segmentation mask 226) and a ground truth (GT) mask 228 and the supervised loss represents the comparison of these two masks. The transformer 214 takes learnable queries 216 and keys and values obtained from feature maps 206 as processed by the mapper 212 of the segmentation model. The input query might be the number of classes×the number of channels which is 256 in the example herein. Other sizes of the input query or other data structures could apply as well. The transformer 214 output is also a type of query which can be the same dimension where the number of classes are the same but there can be different values. The keys and values can also be obtained from feature maps from different depths and even from the output.

As noted above, the transformer 214 produces a transfer matrix 220 which is then multiplied with the logits of the output network 210 to produce a new set of logits as noted above.

The old set of logits are trained using an unsupervised loss shown with respect to the output network 210 while the new set of logits are trained using the supervised loss shown with respect to the framework 224. This training strategy enforces the transformer 214 to learn a transformation between unsupervised prediction mask 209 and supervised segmentation mask 226.

In some aspects, at test-time, the transformer 214 is kept frozen. The transformer 214 can be kept frozen while the unsupervised output or unsupervised loss shown in output network 210 is backpropagated through the segmentation network 203 for further training of the segmentation network 203. The way the transformer 214 receives data from the segmentation network 203 prevents backpropagation data from reaching or impacting the transformer 214.

During a test-time inference mode, the system 200 can use the supervised segmentation mask 226 for predictions. In this case, no adaption is needed. The use of the transformer 214 improves the performance of the system 200. In the inference mode, without adaptation, the image 202 is passed through the segmentation network 203 and the system 200 uses the supervised segmentation mask 226 as the output. The system 200 does not use the unsupervised prediction mask 209 as the formal output but in this scenario the unsupervised prediction mask 209 is used in connection with the transfer matrix 220 to generate the supervised segmentation mask 226. The supervised segmentation mask 226 in this case is better than the unsupervised prediction mask 209.

The value of P can be in this example 256× the number of classes. The output of the transformer 214 times by P as shown in equation 304 will be the number of classes times the number of classes. The transfer matrix 220 in this regard is structured to have the proper dimensions for the relationship between the supervised logits and the unsupervised logits.

Another mode can be test-time adaptation. In this case, the system 200 can use the unsupervised prediction mask 209 and the losses shown in output network 210 for updating the segmentation network 203 through backpropagation. After the segmentation network 203 is updated, the system 200 can transition back to the inference mode in which the inference is done using the supervised segmentation mask 226 of the transformer 214 and other components shown in FIG. 2A. Again, in this scenario, the unsupervised prediction mask 209 is not used as the preferred output but is used in connection with the transfer matrix 220 to generate the supervised segmentation mask 226.

In the adaptation mode, when the unsupervised loss shown in output network 210 is used to further refine or train the segmentation network 203, the second head (output) associated with the transformer 214 is configured via the use of a forward pass such that the backpropagation does not propagate to the transformer 214. In other words, the transformer 214 is frozen in one respect in that the backpropagation of the unsupervised loss only impacts or further trains the segmentation network 203 and not the transformer 214.

Once the parameters on the segmentation network 203 are updated using the unsupervised loss, then the inference process can proceed as outlined above where the prediction output of the system is selected to be the supervised segmentation mask 226 via the use of the unsupervised output which is used in connection with the transfer matrix 220.

As described herein, systems and techniques are provided for performing image processing using one or more image processing machine learning networks that enforce consistency across at least one variation of unlabeled data applied to a pre-trained model. FIG. 3B illustrates the various objectives 310 used in the systems and techniques. For example, a supervised objective 312 can be used to minimize cross entropy loss. The supervised objective 312 is used in connection with the supervised segmentation mask 226 (which can also be called the supervised head). Several unsupervised objectives 314 can be applied with respect to the unsupervised prediction mask 209 to minimize entropy or to maximize the probabilities squares. The various options for the unsupervised objectives can be applied to the unsupervised prediction mask 209. Equation (6) in this disclosure below shows the use of these loss equations. The approaches disclosed herein can be used with any pre-trained segmentation network and backbone, which allows the systems and techniques to evolve with the state of the art.

As described above, the systems and techniques described herein can determine a relationship between supervised and unsupervised semantic segmentation maps. For example, an input image $x_i \in \mathbb{R}^{H \times W \times 3}$ can be fed forward through a feature extractor F (e.g., the feature encoder 204 of FIG. 2A) to produce a feature map $f_i \in \mathbb{R}^{H' \times W' \times C}$ such that $f_i=F(x_i)$. The feature map f can be fed through a classifier or prediction head denoted as $H_P$ (e.g., prediction head 208) to produce output logits $o_i \in \mathbb{R}^{H \times W \times L}$ such that $o_i=H_P(f_i)$. These logits may then be passed through a Softmax operation (or other similar operation) to obtain a probability map $p_i \in \mathbb{R}^{H \times W \times L}$ of the segmentation (e.g., segmentation prediction mask 209).

For traditional end-to-end training of F and $H_P$, a system (e.g., the system 200) can use cross entropy loss $\mathcal{L}_{XEnt}(p_i, y_i)$ between the predicted probability maps $p_i$ and ground truth segmentation labels $y_i$. However, according to the systems and techniques described herein, the system can aim to learn the relationship between supervised and unsupervised predictions, which can facilitate test-time adaptation from unsupervised image sequences. The notation of output logits can be changed from for the transformer decoder input $$o_i \text{ to } o_i^u$$

$$q^s \cdot q_i^o$$

to consider the logit as an unsupervised output logit. The system may then use the feature map $f_i$ as a conditioning input for a transformer decoder module (e.g., of transformer 214 of FIG. 2A) to construct keys and values (e.g., the keys and values described with respect to FIG. 2A). The transformer decoder may use learnable queries $q^s \in \mathbb{R}^{L \times C}$ (e.g., queries 216 of FIG. 2A), which are C dimensional vector representations of categories to be identified for the supervised output. As described herein, to generate the keys and values, patches are obtained from the feature map $f_i$. The patches are flattened to produce n tokens $t_i \in \mathbb{R}^{n \times c}$. These tokens $t_i$ are then fed into a multi-head attention stage of the transformer decoder followed by a feedforward network. To understand the multi-head attention scheme, a single-head attention mechanism can be defined as follows:

$$q = q^s W^q, \; k_i = t_i W^k, \; v_i = t_i W^v \tag{1}$$

where $W^q$, $W^k$, $W^v \in \mathbb{R}^{C \times C}$ are weight matrices to produce linear representations of the raw tokens. These processed tokens may then be used to produce the attention operation Att(•) such that:

$$Att(q, t_i, t_i) = \text{Softmax}\left(q k_i^T\right) v_i \tag{2}$$

For the multi-head attention operation MHAtt(•) having M heads, $q^s$ and $t_i$ are split into M parts $$q_1^s, \ldots, q_M^s \text{ and } t_{i,1}, \ldots, t_{i,M},$$

where dimension of each split is C'=C/M. Attention operation is applied over all such splits to produce:

$$\tilde{q}_i^s = [Att_1(q_1^s, t_{i,1}, t_{i,1}); \ldots ; Att_M(q_M^s, t_{i,M}, t_{i,M})] \tag{3}$$

$$MHAtt(q, t_i, t_i) = LN(q^s + DO(\tilde{q}_i^s W)) \tag{4}$$

where LN is a layer normalization operation, DO is a dropout operation, and $W \in \mathbb{R}^{C \times C}$ is linear mapping. The output of the multi-head attention mechanism may be passed through a two-layer feed-forward network, where each layer includes rectified linear unit (ReLU) activation followed by dropout, residual connection, and layer normalization (e.g., similar to equation (4) above). Alternating multi-head attention and feed-forward networks can produce multiple layers of the transformer 214. The output of the transformer 214 can produce a representation $$q_i^o \in \mathbb{R}^{L \times C}$$

thus includes C dimensional vector representation of each of the classes conditioned on the feature map of the input image. This representation can then be mapped to a L-dimensional space via a linear projection 218 for the system 200 to produce a transfer matrix 220 (e.g., a weight matrix) that relates supervised and unsupervised logits. Hence, the following operations can be applied:

$$W_u^s = \text{Softmax}(q_i^o U), \; o_i^s = o_i^u W_u^{sT}. \tag{5}$$

where $U \in \mathbb{R}^{C \times L}$ is a projection layer and $$o_i^s$$

is the supervised output logits. These logits may then be passed through a Softmax operation (or other similar operation) to obtain the probability map $$p_i^s \in \mathbb{R}^{H \times W \times L}$$

of the segmentation. For traditional end-to-end training of F and $H_P$, the system can use cross entropy loss $$L_{XEnt}(p_i^s, y_i)$$

between the predicted probability maps $$p_i^s$$

and ground truth segmentation labels $y_i$. For training the unsupervised logits $$o_i^u,$$

the system can use an unsupervised loss $$L_{USup}(o_i^u).$$

This unsupervised loss may be one of the losses used for test-time adaptation, such as Min Entropy, Max Squares, or the augmentation consistency loss described herein (e.g., L1 loss, L2 loss, KL divergence, etc.). The system can thus train the entire semantic segmentation network including the feature extractor F (e.g., the feature encoder 204 of FIG. 2A), the classifier head $H_P$ (e.g., the prediction head 208 of FIG. 2A), and the transformer module T (e.g., the transformer 214 of FIG. 2A) using a total loss, such as the following total loss:

$$L_{Tot}(x_i, y_i) = L_{XEnt}(p_i^s, y_i) + \lambda L_{U\,Sup}(o_i^u) \qquad (6)$$

By minimizing this training loss with the source domain data, the system can learn the mapping between unsupervised and supervised segmentation predictions. During online test-time adaptation over a sample x, the transformer module may be kept frozen, and the system can use the output $o^u$ of the unsupervised head for obtaining the unsupervised loss $L_{TTA}(o^u)$ to be used for updating the model parameters. After adaptation is complete, the system may use the supervised head outputs $o^s$ for evaluation purposes.

As described herein, the framework of the disclosed systems and techniques provide for online test-time adaptive semantic segmentation. The techniques include training a transformer 214 to map unsupervised predictions to supervised predictions. The systems and techniques also propose augmentation consistency as a fine-tuning objective to adapt the model on unlabeled target domain data. The proposed systems and techniques outperform other competitive methods both quantitatively and qualitatively. The design and ablations of the framework improve segmentation performance.

Figure 4:
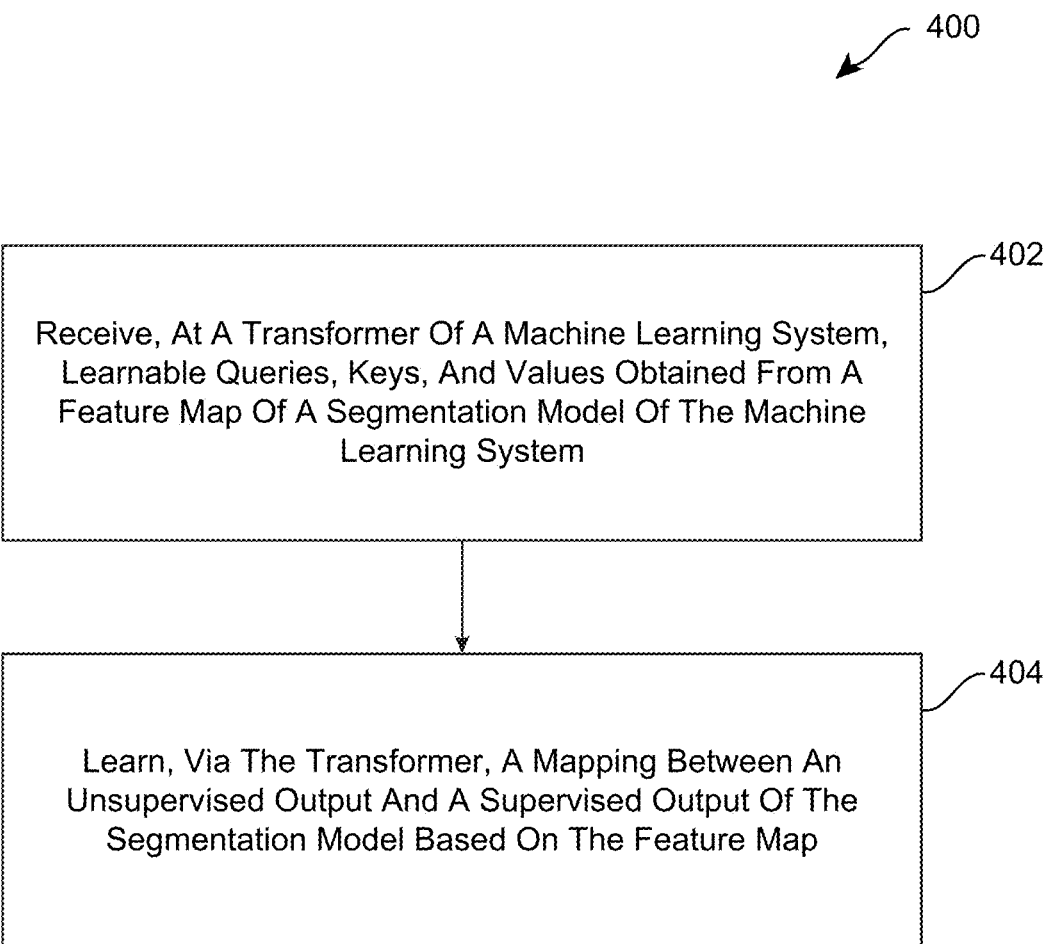
FIG. 4 is a flow diagram illustrating an example of a process training the transformer and generating a transfer matrix, in accordance with some examples.

FIG. 4 illustrates a process 400 for producing an output from a machine learning model in which an inference mode and an adaptation mode could be used. At block 402, the process 400 can include receiving, at a transformer of a machine learning system (e.g., the transformer 214 of the system 200 of FIG. 2A), learnable queries, keys, and values obtained from a feature map of a segmentation model of the machine learning system. For instance, the learnable queries may include the queries 216 and the keys and values may include those discussed with respect to FIG. 2A.

At block 404, the process 400 may include learning, via the transformer (e.g., the transformer 214 of the system 200 of FIG. 2A), a mapping between an unsupervised output (e.g., the unsupervised predicted segmentation mask 209 of FIG. 2A) and a supervised output (e.g., the supervised segmentation mask 226 of FIG. 2A) of the segmentation model based on the feature map.

In some aspects, to learn the mapping between the unsupervised output and the supervised output of the segmentation model based on the feature map, the process 400 can include generating, via the transformer, a transfer matrix (e.g., transfer matrix 220). The process 400 may further include multiplying (e.g., via multiplier 222) the transfer matrix with the unsupervised output of the segmentation model to produce the supervised output. In some cases, the transformer is configured to apply an affinity feature with a linear prediction (e.g., from the linear projection 218) to generate the transfer matrix (e.g., transfer matrix 220). For instance, the affinity feature may be based on a query, a key, a value, a linear projection, or any combination thereof. In some examples, as described previously, a token times a linear projection configured for keys may produce a set of keys, another token or the same token times a linear projection for values will produce a set of values, and so on. In some examples, the key and the value are tokenized.

In some aspects, the process 400 may include training a first set of features associated with the unsupervised output of the segmentation model using an unsupervised loss. The process 400 may include training a second set of features associated with the supervised output using a supervised loss. In some cases, the first set of features includes a first set of logits, and the second set of features includes a second set of logits. In some examples, during an inference mode (or test-time inference) of the machine learning system, the process 400 may use the supervised output based on the supervised loss for predictions. In some examples, during an adaptation mode (or test-time adaptation) of the machine learning system, the process 400 may use the unsupervised output and the unsupervised loss for updating the segmentation model to yield an adapted segmentation model. In some cases, the process 400 may include freezing the transformer at test time in the adaption mode. In some aspects, the process 400 may include receiving additional data and processing the additional data using the adapted segmentation model to generate an additional supervised output.

As described herein, the systems and techniques described herein can learn transformation(s) between two heads (e.g., two different outputs of the segmentation network 203) which can give more insight with respect to how supervised and unsupervised learning takes place. Furthermore, as noted above, there is flexibility with respect to whether the system needs to adapt the segmentation network 203 or not adapt depending on capabilities of the device upon which the segmentation network 203 is deployed.

In another example, an apparatus for processing data is provided. The apparatus (e.g., the computing device architecture 500 shown in FIG. 5) may include at least one memory (e.g., the memory 515, 520, 535 and/or 512 in FIG. 5) configured to store features associated with a transformer (e.g., the transformer 214 of the system 200 of FIG. 2A), of a machine learning system and at least one processor (e.g., implemented in circuitry) coupled to the at least one memory and configured to: receive, via the transformer of the machine learning system, learnable queries, keys, and values obtained from a feature map of a segmentation model of the machine learning system (e.g., the segmentation network 203 in FIG. 2A); and learning, via the transformer, a mapping between an unsupervised output and a supervised output of the segmentation model based on the feature map.

In another example, a non-transitory computer-readable medium (e.g., the memory 515, 520, 535 and/or 512 in FIG. 5) is provided that has stored thereon instructions that, when executed by one or more processors, cause the one or more processors to be configured to: receive, via a transformer (e.g., the transformer 214 of the system 200 of FIG. 2A), of a machine learning system, learnable queries, keys, and values obtained from a feature map of a segmentation model (e.g., the segmentation network 203 in FIG. 2A) of the machine learning system; and learning, via the transformer, a mapping between an unsupervised output and a supervised output of the segmentation model based on the feature map.

In another example, an apparatus (e.g., the computing device architecture 500 shown in FIG. 5) is provided. The apparatus may include means for receiving, via a transformer of a machine learning system, learnable queries, keys, and values obtained from a feature map of a segmentation model of the machine learning system; and means for learning, via the transformer, a mapping between an unsupervised output and a supervised output of the segmentation model based on the feature map.

Examples of uses for the disclosed solution can include self-driving vehicles. Most of the urban segmentation models are trained on clean real datasets or simulated game datasets. The solution disclosed herein can be useful for online adaptation to real world scenes where accurate segmentation masks along with depth will allow the vehicle to take appropriate control actions, e.g., velocity control, steering, braking.

For extended reality use cases, indoor segmentation is required for use cases such as human occlusion rendering and semantic reconstruction. The indoor environment on which the segmentation models are trained on can have different characteristics than the deployed one. There might be changes in layout, brightness etc. In such situations, online adaptation is important to encounter the domain shift of pre-training dataset and test dataset.

Robotics is another area where this technology can be useful. Accurate semantic segmentation will enable a variety of capabilities in robotics, such as navigation, localization, and interaction with physical objects in the environment. To tackle domain shift characteristics between source dataset and target dataset such as changes in object characteristics, environment changes like illumination etc.

In some examples, the processes described herein (e.g., process 400 and/or any other process described herein) may be performed by a computing device, apparatus, or system. In some examples, the process 400 can be performed by a computing device or system having the computing device architecture 500 of FIG. 5. The computing device, apparatus, or system can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein, including the process 400 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 400 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 400 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program including a plurality of instructions executable by one or more processors. The computer-readable or machine-readable storage medium may be non-transitory.

Figure 5:
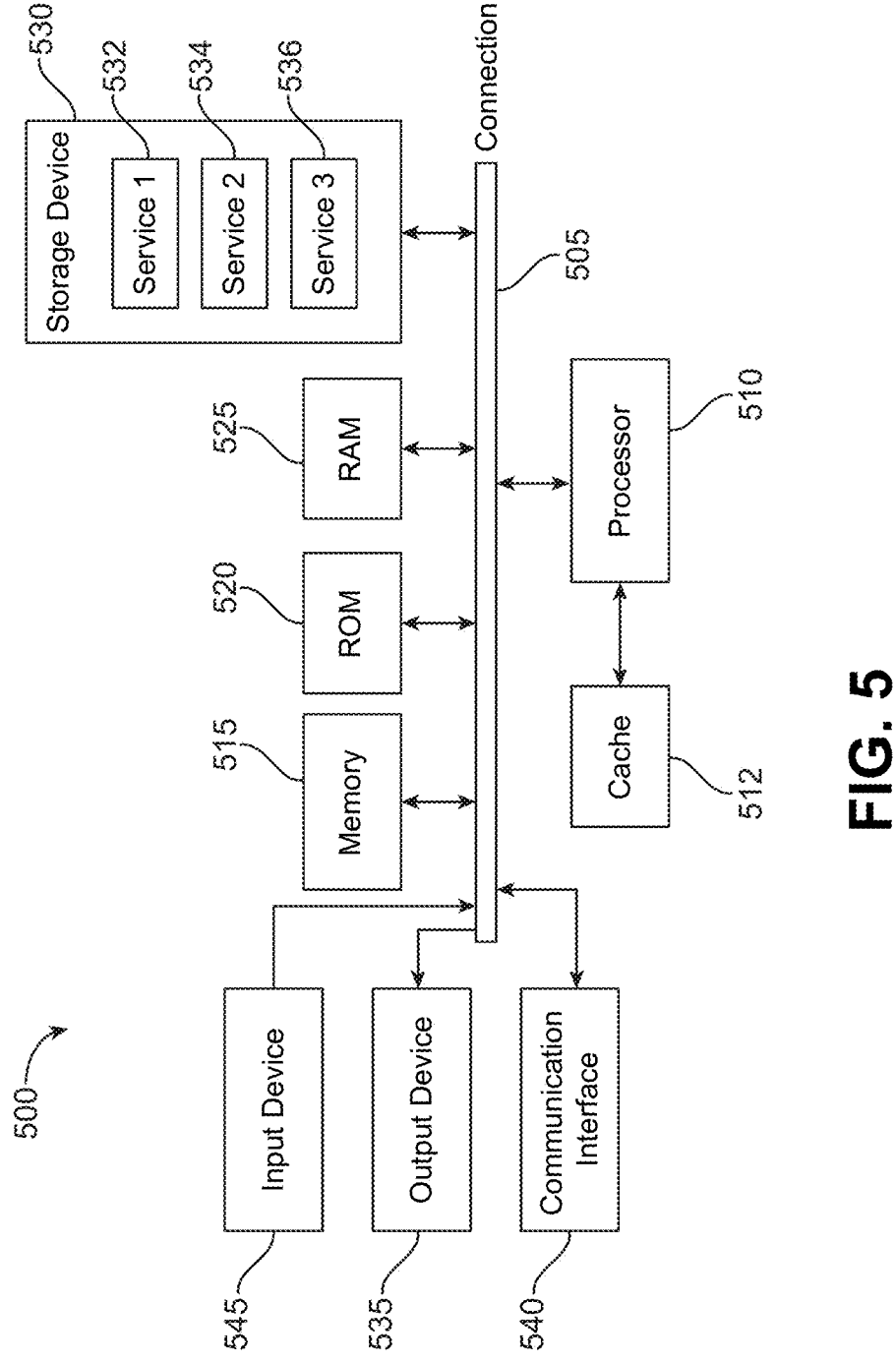
FIG. 5 is a block diagram illustrating an example of a computing system for implementing certain aspects described herein.

FIG. 5 illustrates an example computing device architecture 500 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. The components of computing device architecture 500 are shown in electrical communication with each other using connection 505, such as a bus. The example computing device architecture 500 includes a processing unit (CPU or processor) 510 and computing device connection 505 that couples various computing device components including computing device memory 515, such as read only memory (ROM) 520 and random-access memory (RAM) 525, to processor 510.

Computing device architecture 500 can include a cache of high-speed memory connected directly with, in close proximity to, or integrated as part of processor 510. Computing device architecture 500 can copy data from memory 515 and/or the storage device 530 to cache 512 for quick access by processor 510. In this way, the cache can provide a performance boost that avoids processor 510 delays while waiting for data. These and other engines can control or be configured to control processor 510 to perform various actions. Other computing device memory 515 may be available for use as well. Memory 515 can include multiple different types of memory with different performance characteristics. Processor 510 can include any general-purpose processor and a hardware or software service, such as service 1 532, service 2 534, and service 3 536 stored in storage device 530, configured to control processor 510 as well as a special-purpose processor where software instructions are incorporated into the processor design. Processor 510 may be a self-contained system, containing multiple cores or processors, a bus, memory controller, cache, etc. A multi-core processor may be symmetric or asymmetric.

To enable user interaction with the computing device architecture 500, input device 545 can represent any number of input mechanisms, such as a microphone for speech, a touch-sensitive screen for gesture or graphical input, keyboard, mouse, motion input, speech and so forth. Output device 535 can also be one or more of a number of output mechanisms known to those of skill in the art, such as a display, projector, television, speaker device, etc. In some instances, multimodal computing devices can enable a user to provide multiple types of input to communicate with the computing device architecture 500. Communication interface 540 can generally govern and manage the user input and computing device output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof. Storage device 530 can include services 532, 534, 536 for controlling processor 510. Other hardware or software modules or engines are contemplated. Storage device 530 can be connected to the computing device connection 505. In one aspect, a hardware module that performs a particular function can include the software component stored in a computer-readable medium in connection with the necessary hardware components, such as processor 510, connection 505, output device 535, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Claim language or other language reciting "at least one processor configured to," "at least one processor being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like.

The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative Aspects of the present disclosure are provided below:

Aspect 1. A processor-implemented method of processing data, comprising receiving, at a transformer of a machine learning system, learnable queries, keys, and values obtained from a feature map of a segmentation model of the machine learning system; and learning, via the transformer, a mapping between an unsupervised output and a supervised output of the segmentation model based on the feature map.

Aspect 2. The processor-implemented method of Aspect 1, wherein learning the mapping between the unsupervised output and the supervised output of the segmentation model based on the feature map comprises: generating, via the transformer, a transfer matrix; and multiplying the transfer matrix with the unsupervised output of the segmentation model to produce the supervised output.

Aspect 3. The processor-implemented method of Aspect 2, wherein the transformer is configured to apply an affinity feature with a linear prediction to generate the transfer matrix.

Aspect 4. The processor-implemented method of Aspect 3, wherein the affinity feature is based at least on one of a query, a key, a value, or a linear projection.

Aspect 5. The processor-implemented method of Aspect 4, wherein the key and the value are tokenized.

Aspect 6. The processor-implemented method of any one of Aspects 1 to 5, further comprising: training a first set of features associated with the unsupervised output of the segmentation model using an unsupervised loss; and training a second set of features associated with the supervised output using a supervised loss.

Aspect 7. The processor-implemented method of Aspect 6, wherein the first set of features comprises a first set of logits, and wherein the second set of features comprises a second set of logits.

Aspect 8. The processor-implemented method of any one of Aspects 6 or 7, further comprising: during an inference mode of the machine learning system, using the supervised output based on the supervised loss for predictions.

Aspect 9. The processor-implemented method of any one of Aspects 6 or 7, further comprising: during an adaptation mode of the machine learning system, using the unsupervised output and the unsupervised loss for updating the segmentation model to yield an adapted segmentation model.

Aspect 10. The processor-implemented method of Aspect 9, further comprising: freezing the transformer at test time in the adaption mode.

Aspect 11. The processor-implemented method of any one of Aspects 9 or 10, further comprising: receiving additional data; and processing the additional data using the adapted segmentation model to generate an additional supervised output.

Aspect 12. An apparatus for processing data, the apparatus comprising: at least one memory configured to store features associated with a transformer of a machine learning system; and at least one processor coupled to the at least one memory and configured to: receive, via the transformer of the machine learning system, learnable queries, keys, and values obtained from a feature map of a segmentation model of the machine learning system; and learning, via the transformer, a mapping between an unsupervised output and a supervised output of the segmentation model based on the feature map.

Aspect 13. The apparatus of Aspect 12, wherein learning the mapping between the unsupervised output and the supervised output of the segmentation model based on the feature map comprises: generating, via the transformer, a transfer matrix; and multiplying the transfer matrix with the unsupervised output of the segmentation model to produce the supervised output.

Aspect 14. The apparatus of Aspect 13, wherein the transformer is configured to apply an affinity feature with a linear prediction to generate the transfer matrix.

Aspect 15. The apparatus of Aspect 14, wherein the affinity feature is based at least on one of a query, a key, a value, or a linear projection.

Aspect 16. The apparatus of Aspect 15, wherein the key and the value are tokenized.

Aspect 17. The apparatus of any one of Aspects 12 to 16, further comprising: training a first set of features associated with the unsupervised output of the segmentation model using an unsupervised loss; and training a second set of features associated with the supervised output using a supervised loss.

Aspect 18. The apparatus of Aspect 17, wherein the first set of features comprises a first set of logits, and wherein the second set of features comprises a second set of logits.

Aspect 19. The apparatus of any one of Aspects 18 or 19, further comprising: during an inference mode of the machine learning system, using the supervised output based on the supervised loss for predictions.

Aspect 20. The apparatus of any one of Aspects 18 or 19, further comprising: during an adaptation mode of the machine learning system, using the unsupervised output and the unsupervised loss for updating the segmentation model to yield an adapted segmentation model.

Aspect 21. The apparatus of Aspect 20, further comprising: freezing the transformer at test time in the adaption mode.

Aspect 22. The apparatus of any one of Aspects 20 or 21, further comprising: receiving additional data; and processing the additional data using the adapted segmentation model to generate an additional supervised output.

Aspect 23. A non-transitory computer-readable medium having stored thereon instructions that, when executed by at least one processor, cause the at least one processor to be configured to: receive, via a transformer of a machine learning system, learnable queries, keys, and values obtained from a feature map of a segmentation model of the machine learning system; and learning, via the transformer, a mapping between an unsupervised output and a supervised output of the segmentation model based on the feature map.

Aspect 24. The non-transitory computer-readable medium of Aspect 23, wherein, to learn the mapping between the unsupervised output and the supervised output of the segmentation model based on the feature map, the non-transitory computer-readable medium stores further instructions, which cause the at least one processor to be further configured to: generate, via the transformer, a transfer matrix; and multiply the transfer matrix with the unsupervised output of the segmentation model to produce the supervised output.

Aspect 25. The non-transitory computer-readable medium of Aspect 24, wherein the transformer is configured to apply an affinity feature with a linear prediction to generate the transfer matrix.

Aspect 26. The non-transitory computer-readable medium of Aspect 25, wherein the affinity feature is based at least on one of a query, a key, a value, or a linear projection.

Aspect 27. The non-transitory computer-readable medium of Aspect 26, wherein the key and the value are tokenized.

Aspect 28. The non-transitory computer-readable medium of any of Aspects 23 to 27, wherein the non-transitory computer-readable medium stores further instructions, which cause the at least one processor to be further configured to: train a first set of features associated with the unsupervised output of the segmentation model using an unsupervised loss; and train a second set of features associated with the supervised output using a supervised loss.

Aspect 29. The non-transitory computer-readable medium of Aspect 28, wherein the first set of features comprises a first set of logits, and wherein the second set of features comprises a second set of logits.

Aspect 30. The non-transitory computer-readable medium of any of Aspects 28 or 29, wherein the non-transitory computer-readable medium stores further instructions, which cause the at least one processor to be further configured to: during an inference mode of the machine learning system, use the supervised output based on the supervised loss for predictions.

Aspect 31. The non-transitory computer-readable medium of any of Aspects 29 or 30, wherein the non-transitory computer-readable medium stores further instructions, which cause the at least one processor to be further configured to: during an adaptation mode of the machine learning system, use the unsupervised output and the unsupervised loss for updating the segmentation model to yield an adapted segmentation model.

Aspect 32. The non-transitory computer-readable medium of Aspect 31, wherein the non-transitory computer-readable medium stores further instructions, which cause the at least one processor to be further configured to: freeze the transformer at test time in the adaption mode.

Aspect 33. The non-transitory computer-readable medium of any of Aspects 31 or 32, wherein the non-transitory computer-readable medium stores further instructions, which cause the at least one processor to be further configured to: receive additional data; and process the additional data using the adapted segmentation model to generate an additional supervised output.

Aspect 34. An apparatus comprising one or more means for performing operations or steps according to any of Aspects 1 to 12.

What is claimed is:

1. A processor-implemented method of processing data, comprising:

receiving, at a transformer of a machine learning system, learnable queries, keys, and values obtained from a feature map of a segmentation model of the machine learning system; and learning, via the transformer, a mapping between an unsupervised segmentation output and a supervised segmentation output of the segmentation model based on the feature map, wherein the segmentation model and the transformer are trained using a unsupervised segmentation loss comprising at least one of a probability-maximization loss or a consistency loss enforcing invariance to geometric or photometric transformations.

2. The processor-implemented method of claim 1, wherein learning the mapping between the unsupervised segmentation output and the supervised segmentation output of the segmentation model based on the feature map comprises:

generating, via the transformer, a transfer matrix; and multiplying the transfer matrix with the unsupervised segmentation output of the segmentation model to produce the supervised segmentation output.

3. The processor-implemented method of claim 2, wherein the transformer is configured to apply an affinity feature with a linear prediction to generate the transfer matrix.

4. The processor-implemented method of claim 3, wherein the affinity feature is based at least on one of a query, a key, a value, or a linear projection.

5. The processor-implemented method of claim 4, wherein the key and the value are tokenized.

6. The processor-implemented method of claim 1, further comprising:

training a first set of features associated with the unsupervised segmentation output of the segmentation model using the unsupervised segmentation loss; and training a second set of features associated with the supervised segmentation output using a supervised segmentation loss.

7. The processor-implemented method of claim 6, wherein the first set of features comprises a first set of logits, and wherein the second set of features comprises a second set of logits.

8. The processor-implemented method of claim 6, further comprising:

during an inference mode of the machine learning system, using the supervised segmentation output based on the supervised segmentation loss for predictions.

9. The processor-implemented method of claim 6, further comprising:

during an adaptation mode of the machine learning system, using the unsupervised segmentation output and the unsupervised segmentation loss for updating the segmentation model to yield an adapted segmentation model.

10. The processor-implemented method of claim 9, further comprising:

freezing the transformer at test time in the adaptation mode.

11. The processor-implemented method of claim 9, further comprising:

receiving additional data; and processing the additional data using the adapted segmentation model to generate an additional supervised segmentation output.

12. An apparatus for processing data, the apparatus comprising:

at least one memory configured to store features associated with a transformer of a machine learning system; and at least one processor coupled to the at least one memory and configured to:

receive, via the transformer of the machine learning system, learnable queries, keys, and values obtained from a feature map of a segmentation model of the machine learning system; and learning, via the transformer, a mapping between an unsupervised segmentation output and a supervised segmentation output of the segmentation model based on the feature map, wherein the segmentation model and the transformer are trained using unsupervised segmentation loss comprising at least one of a probability-maximization loss or a consistency loss enforcing invariance to geometric or photometric transformations.

13. The apparatus of claim 12, wherein, to learn the mapping between the unsupervised segmentation output and the supervised segmentation output of the segmentation model based on the feature map, the at least one processor is configured to:

generate, via the transformer, a transfer matrix; and multiply the transfer matrix with the unsupervised segmentation output of the segmentation model to produce the supervised segmentation output.

14. The apparatus of claim 13, wherein the transformer is configured to apply an affinity feature with a linear prediction to generate the transfer matrix.

15. The apparatus of claim 14, wherein the affinity feature is based at least on one of a query, a key, a value, or a linear projection.

16. The apparatus of claim 15, wherein the key and the value are tokenized.

17. The apparatus of claim 12, wherein the at least one processor is configured to:

train a first set of features associated with the unsupervised segmentation output of the segmentation model using the unsupervised segmentation loss; and train a second set of features associated with the supervised segmentation output using a supervised segmentation loss.

18. The apparatus of claim 17, wherein the first set of features comprises a first set of logits, and wherein the second set of features comprises a second set of logits.

19. The apparatus of claim 17, wherein the at least one processor is configured to:

during an inference mode of the machine learning system, use the supervised segmentation output based on the supervised segmentation loss for predictions.

20. The apparatus of claim 17, wherein the at least one processor is configured to:

during an adaptation mode of the machine learning system, use the unsupervised segmentation output and the unsupervised segmentation loss for updating the segmentation model to yield an adapted segmentation model.

21. The apparatus of claim 20, wherein the at least one processor is configured to:

freeze the transformer at test time in the adaptation mode.

22. The apparatus of claim 20, wherein the at least one processor is configured to:

receive additional data; and process the additional data using the adapted segmentation model to generate an additional supervised segmentation output.

23. A non-transitory computer-readable medium having stored thereon instructions that, when executed by at least one processor, cause the at least one processor to be configured to:

receive, via a transformer of a machine learning system, learnable queries, keys, and values obtained from a feature map of a segmentation model of the machine learning system; and learning, via the transformer, a mapping between an unsupervised segmentation output and a supervised segmentation output of the segmentation model based on the feature map, wherein the segmentation model and the transformer are trained using unsupervised segmentation loss comprising at least one of a probability-maximization loss or a consistency loss enforcing invariance to geometric or photometric transformations.

24. The non-transitory computer-readable medium of claim 23, wherein, to learn the mapping between the unsupervised segmentation output and the supervised segmentation output of the segmentation model based on the feature map, the non-transitory computer-readable medium stores further instructions, which cause the at least one processor to be further configured to:

generate, via the transformer, a transfer matrix; and multiply the transfer matrix with the unsupervised segmentation output of the segmentation model to produce the supervised segmentation output.

25. The non-transitory computer-readable medium of claim 24, wherein the transformer is configured to apply an affinity feature with a linear prediction to generate the transfer matrix.

26. The non-transitory computer-readable medium of claim 25, wherein the affinity feature is based at least on one of a query, a key, a value, or a linear projection.

27. The non-transitory computer-readable medium of claim 26, wherein the key and the value are tokenized.

28. The non-transitory computer-readable medium of claim 23, wherein the non-transitory computer-readable medium stores further instructions, which cause the at least one processor to be further configured to:

train a first set of features associated with the unsupervised segmentation output of the segmentation model using the unsupervised segmentation loss; and train a second set of features associated with the supervised segmentation output using a supervised segmentation loss.

29. The non-transitory computer-readable medium of claim 28, wherein the first set of features comprises a first set of logits, and wherein the second set of features comprises a second set of logits.

30. The non-transitory computer-readable medium of claim 28, wherein the non-transitory computer-readable medium stores further instructions, which cause the at least one processor to be further configured to:

during an inference mode of the machine learning system, use the supervised segmentation output based on the supervised segmentation loss for predictions.

* * * * *